United States Patent
Kreutzweiser

[15] 3,652,142
[45] Mar. 28, 1972

[54] CONTAINER

[72] Inventor: Charles E. Kreutzweiser, Waterloo, Ontario, Canada

[73] Assignee: Electrohome Limited, Kitchener, Ontario, Canada

[22] Filed: Sept. 22, 1970

[21] Appl. No.: 74,263

[52] U.S. Cl. ................................312/8, 312/284, 220/31 S, 220/38
[51] Int. Cl. ......................................................A47b 81/06
[58] Field of Search..................312/8, 284, 285; 220/31 R, 220/31 S, 38

[56] References Cited

UNITED STATES PATENTS 2,128,008  8/1938  Meeker..........................312/284 UX
2,326,886  8/1943  Rathbun..............................220/31 S Primary Examiner—James C. Mitchell
Attorney—Sim & McBurney

[57] ABSTRACT

A combination of a container and a lid in which the container and lid have no physical interconnection. The lid is movable between a closed position an open position in which the lid may be maintained.

19 Claims, 6 Drawing Figures

PATENTED MAR 28 1972

INVENTOR.
CHARLES E. KREUTZWEISER
BY
Agents

CONTAINER

This invention relates to a combination of a container and a lid, more particularly to a record player.

This invention is illustrated by the accompanying drawings, in which.

The invention will be particularly described with reference to a record player, but clearly the invention has other applications.

Figure 1:
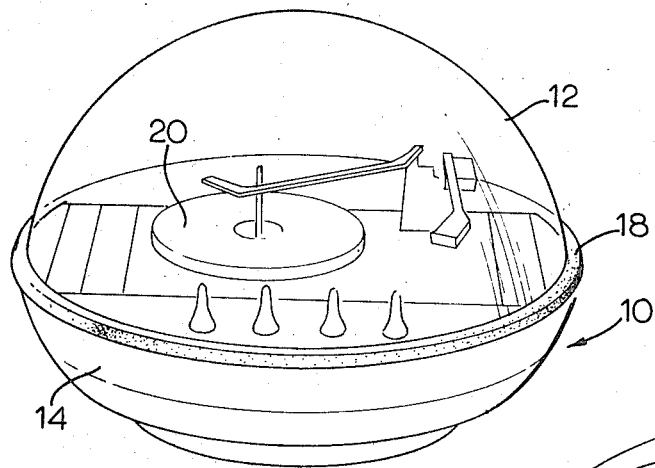
FIG. 1 is a perspective view of a first embodiment of the invention with the lid in a closed position.
Figure 2:
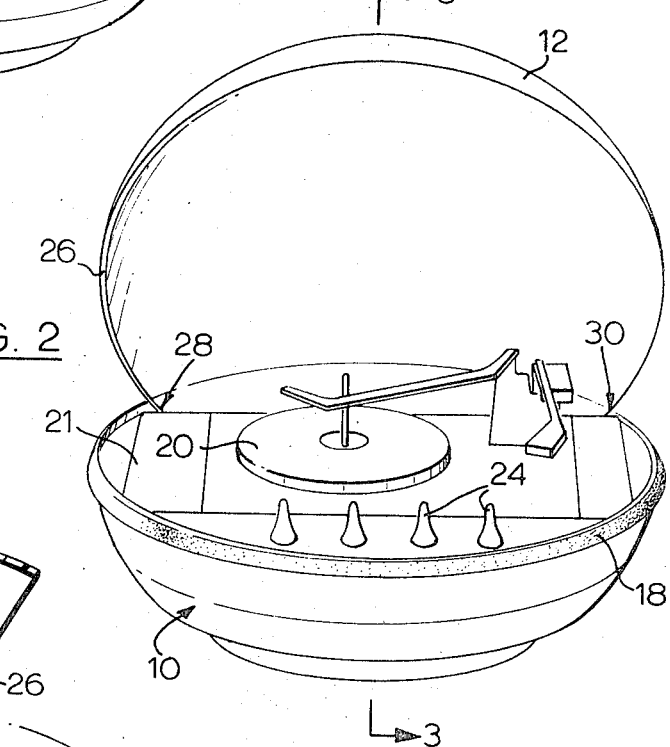
FIG. 2 is a perspective view of the first embodiment with the lid in the open position.
Figure 3:
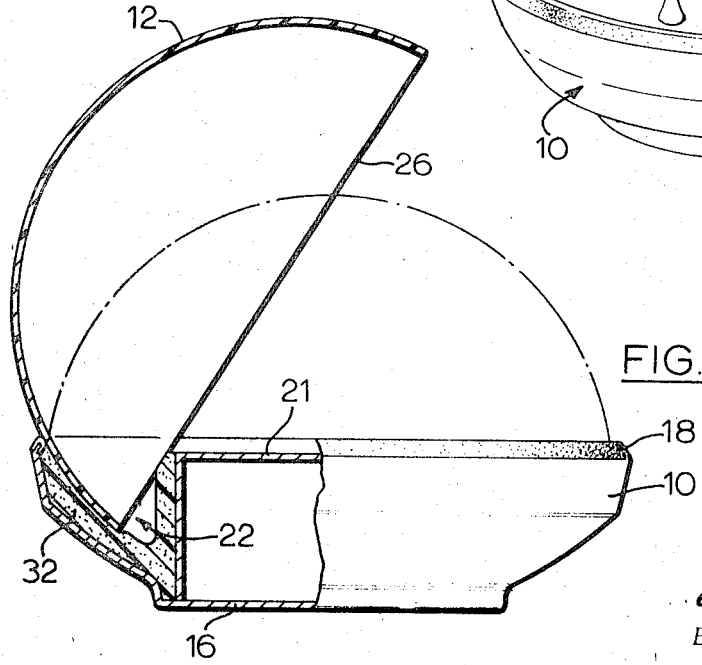
FIG. 3 is a part sectional view taken along line 3—3 of FIG. 2.

Referring to FIGS. 1 to 3 of the drawings, a first embodiment includes a container 10 and a hollow part spherical lid 12. The lid 12 is seated on the container 10 but is not physically interconnected with the container. The lid 12 therefore may be removed from the container 10 by simply lifting the lid 12 off the container 10.

In the embodiment illustrated, the container 10 has a circular cross section and has tapering external walls 14 terminating in a base 16. The circular perimeter 26 of lid 12 in the embodiment illustrated is of a slightly less diameter than that of the rim lip 18 of container 10, thereby the lid fits inside the lip 18 of the container 10.

The shape illustrated gives the combination a pleasing external appearance. The invention, however, is not limited to such specific shapes and dimensions.

The container 10 houses a record player 20 of conventional construction mounted on a mounting board 21 between which and a wall 32 is defined a cavity 22 into which is receivable a part of the lid 12. The record player may include an amplifier (not shown) associated therewith and controls 24 to control operation of such amplifier and the turntable.

The lid 12 is movable between the closed position illustrated in FIG. 1 and the open position illustrated in FIGS. 2 and 3. In the open position, the plane in which the perimetrical edge 26 of the lid lies intersects at an acute angle less than 90° the plane of the perimetrical edge of the lid in the closed position, and part of the lid 12 is received within the cavity 22.

In the open position, the edge 26 of the lid 12 engages the mounting board of the record player 20 at points 28 and 30. The lid 12 tends to move about the points of engagement 28 and 30 towards the closed position shown in FIG. 1. Such movement may be simply pivotal movement or a combination of pivotal and translational movements, depending on the relative shape and dimensions of the lid 12 and the cavity 22.

When lid is in the open position shown in FIGS. 2 and 3, and as more clearly illustrated in FIG. 3, part of the external surface of the lid is in frictional face-to-face contact with wall 32 defining a part of the cavity 22. The frictional contact is sufficient to overcome the tendency of the lid 12 to move towards the closed position of FIG. 1 and the lid thereby is maintained in the open position of FIG. 2.

Typically, the lid 12 is constructed of transparent synthetic polymeric material, typically an acrylic polymer which may be provided with a smoked appearance, if desired. The lid 12 also may be opaque, if desired, and constructed of a suitable material.

Where the lid 12 is constructed of an acrylic polymer, the wall 32 typically may be formed of a foamed polyurethane resin and the frictional contact between the acrylic polymer surface and the foamed polyurethane resin is sufficient to overcome the tendency of the lid 12 to move towards the closed position. Other materials of construction may be employed for the wall 32, provided that sufficient friction is generated by the face-to-face contact between the external surface of the lid 12 and the wall 32.

Figure 4:
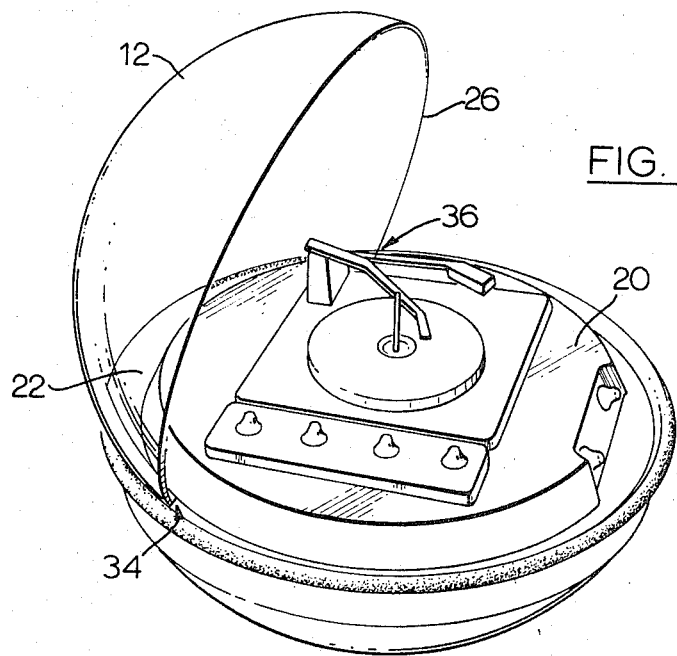
FIG. 4 is a perspective view of a second embodiment of the invention with the lid in the open position.
Figure 5:
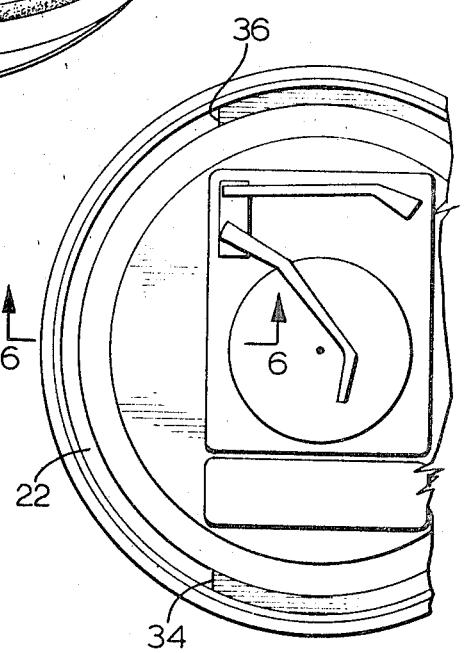
FIG. 5 is a top elevational view of the second embodiment with the lid removed.
Figure 6:
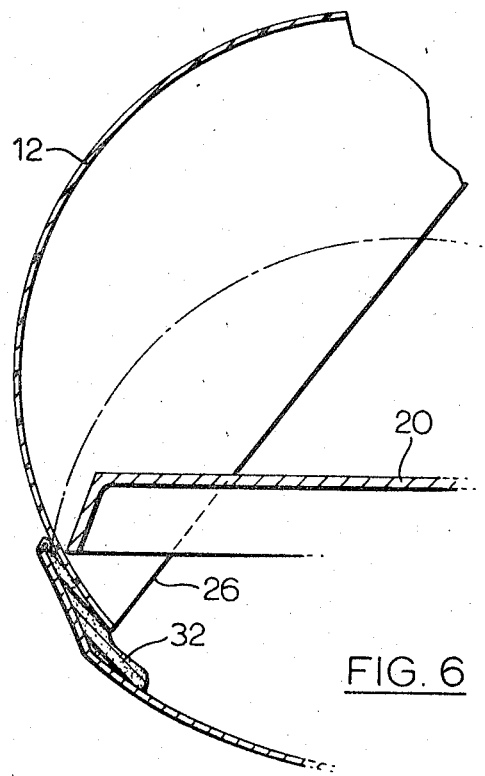
FIG. 6 is a sectional view taken along line 6—6 of FIG. 5.

Referring now to FIGS. 4 to 6, a second embodiment is similar to that of FIGS. 1 to 3, and like reference numerals have been utilized to identify like parts. The second embodiment differs from the first in the design of the turntable and the provision of a differently shaped opening to the cavity 22. The opening to the cavity is in the shape of an arcuate slot whereas, in FIGS. 1 to 3, the cavity is in the shape of a segment of a circle. The shape of the opening of the cavity is immaterial to the invention, the only criterion being that the cavity is able to receive part of the lid 12.

In this embodiment, when the lid is in its open position as shown in FIG. 4, the edge 26 of the lid 12 engages the mounting board of the record player 20 at the extremities 34 and 36 of the arcuate slot defining the opening to the cavity 22.

As in the case of the first embodiment part of the external surface of the lid 12 is in frictional face-to-face contact with a wall 32 defining a part of the cavity 22. The frictional contact is sufficient to overcome the tendency of the lid 12 to move about the points 34 and 36 towards its closed position. The lid 12 thereby is maintained in the open position shown in FIG. 4.

It will be seen therefore that the present invention provides a unique combination of a container and a lid, in which the lid is entirely out of physical interconnection with the container, and yet the lid is movable between a closed and an open position and may be maintained in the open position.

Modifications are possible within the scope of the invention.

What I claim is:

1. In combination, a container and a hollow part spherical lid having a perimetrical edge and an interior surfa said lid being seated on but not physically interconnected with said container, whereby said lid may be removed from said container by simply lifting said lid off said container, said container including a cavity for reception of part of said lid, said lid being movable between a closed position where it closes the container and an open position wherein said part of said lid is received in said cavity, means within said container engaged by said perimetrical edge of said lid when said lid is in said open position and about which said lid tends to move towards said closed position, said exterior surface of said lid being in frictional face-to-face contact with a wall defining a part of said cavity when said lid is in said open position, said frictional contact being sufficient to overcome said tendency to move whereby said lid may maintain said open position.

2. The combination of claim 7 wherein said container has a generally circular cross section and has a generally inwardly tapering outer wall terminating in a flat base.

3. The combination of claim 2 wherein said lid has a circular cross section and a maximum diameter slightly less than the maximum diameter of said container.

4. The combination of claim 1 wherein said container houses a record player and said lid is transparent.

5. The combination of claim 4 wherein said cavity has an opening through which said lid passes in moving between said open and closed position and which is the segment of a circle.

6. The combination of claim 4 wherein said cavity has an opening through which said lid passes in moving between said open and closed positions and which is arcuate.

7. The combination of claim 1 wherein said perimetrical edge lies in a plane, said plane in said open position of said lid intersecting said plane in said closed position of said lid at an angle less than 90°.

8. The combination of claim 1 wherein said cavity has an opening through which said lid passes in moving between said open and closed positions and which is arcuate, said means within said container being disposed at the two ends of said arcuate opening.

9. The combination of claim 1, wherein said container has a lip overlapping a part of said lid when said lid is in said closed position and preventing said lid from sliding sideways off said container.

10. The combination of claim 1, wherein said cavity has an opening through which said lid passes in moving between said open and closed positions and which is arcuate and wherein said container has a lip overlapping a part of said lid when said lid is in said closed position and preventing said lid from sliding sideways off said container.

11. The combination of claim 1, wherein said cavity has an opening through which said lid passes in moving between said open and closed positions and which is arcuate, said means within said container being disposed at the two ends of said arcuate opening, and wherein said container has a lip overlapping a part of said lid when said lid is in said closed position and preventing said lid from sliding sideways off said container.

12. The combination of claim 1, wherein said cavity has an opening through which said lid passes in moving between said open and closed positions and which is arcuate, said means within said container being disposed at the two ends of said arcuate opening, wherein said container has a lip overlapping a part of said lid when said lid is in said closed position and preventing said lid from sliding sideways off said container, and wherein said container houses a record player and said lid is transparent.

13. The combination of claim 1, wherein said lid has a circular cross section and a maximum diameter slightly less than the maximum diameter of said container, and wherein said container has a lip overlapping a part of said lid when said lid is in said closed position and preventing said lid from sliding sideways off said container.

14. The combination of claim 1, wherein said lid has a circular cross section and a maximum diameter slightly less than the maximum diameter of said container, wherein said container has a lip overlapping a part of said lid when said lid is in said closed position and preventing said lid from sliding sideways off said container, wherein said cavity has an opening through which said lid passes in moving between said open and closed positions and which is arcuate, and wherein said means within said container are disposed at the two ends of said arcuate opening.

15. The combination of claim 1, wherein said lid has a circular cross section and a maximum diameter slightly less than the maximum diameter of said container, wherein said container has a lip overlapping a part of said lid when said lid is in said closed position and preventing said lid from sliding sideways off said container, wherein said cavity has an opening through which said lid passes in moving between said open and closed positions and which is arcuate, wherein said means within said container are disposed at the two ends of said arcuate opening, and wherein said container houses a record player and said lid is transparent.

16. The combination of claim 1, wherein the portion of said wall contacted by said lid when said lid is in said open position is lined with a material adapted not to scratch said lid.

17. The combination of claim 1, wherein the portion of said wall contacted by said lid when said lid is in said open position is lined with foamed polyurethane.

18. The combination of claim 1, wherein the portion of said wall contacted by said lid when said lid is in said open position is lined with a material adapted not to scratch said lid, wherein said lid has a circular cross section and a maximum diameter slightly less than the maximum diameter of said container, wherein said container has a lip overlapping a part of said lid when said lid is in said closed position and preventing said lid from sliding sideways off said container, wherein said cavity has an opening through which said lid passes in moving between said open and closed positions and which is arcuate and wherein said means within said container are disposed at the two ends of said arcuate opening.

19. The combination of claim 1, wherein the portion of said wall contacted by said lid when said lid is in said open position is lined with a material adapted not to scratch said lid, and wherein said lid is fabricated of a synthetic polymeric material.

* * * * *